US012776448B2

(12) United States Patent
Goto

(10) Patent No.: US 12,776,448 B2
(45) Date of Patent: Oct. 27, 2026

(54) MULTILAYER CERAMIC ELECTRONIC COMPONENT

(71) Applicant: TAIYO YUDEN CO., LTD., Tokyo (JP)

(72) Inventor: Tetsuhiro Goto, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 146 days.

(21) Appl. No.: 18/955,363

(22) Filed: Nov. 21, 2024

(65) Prior Publication Data

US 2025/0182966 A1 Jun. 5, 2025

(30) Foreign Application Priority Data

Nov. 30, 2023 (JP) ................................ 2023-202590

(51) Int. Cl.
*H01G 4/008* (2006.01)
*H01G 4/12* (2006.01)
(Continued)

(52) U.S. Cl.
CPC ............... *H01G 4/008* (2013.01); *H01G 4/12* (2013.01); *H01G 4/232* (2013.01); *H01G 4/30* (2013.01)

(58) Field of Classification Search
CPC .......... H01G 4/008; H01G 4/12; H01G 4/232; H01G 4/30; H01G 4/012
See application file for complete search history.

(56) References Cited

U.S. PATENT DOCUMENTS 9,287,043 B2 * 3/2016 Lee ........................ H01G 4/005
10,872,728 B2 * 12/2020 Yoon .................... H01G 4/1227
(Continued)

FOREIGN PATENT DOCUMENTS

CN 118120038 A * 5/2024 ............... H01G 4/12
JP H11-340083 12/1999
(Continued)

OTHER PUBLICATIONS

Translation KR '507 (Year: 2022).*
Translation WO '258 (Year: 2023).*

*Primary Examiner* — Dion R. Ferguson
(74) *Attorney, Agent, or Firm* — IPUSA, PLLC

(57) ABSTRACT

A multilayer ceramic electronic component includes a laminate including an internal electrode group including internal electrodes laminated along a first axis, and ceramic layers, each of which is between adjacent internal electrodes; and a pair of external electrodes connected to the internal electrodes. The internal electrode group includes a first internal electrode group including one or more first internal electrodes at an end in a first direction of the first axis; a second internal electrode group including one or more second internal electrodes at an end in a second direction opposite to the first direction; and a third internal electrode group including one or more third internal electrodes between the first and second internal electrode groups. A first thermal expansion coefficient of the first internal electrode and a second thermal expansion coefficient of the second internal electrode are less than a third thermal expansion coefficient of the third internal electrode.

19 Claims, 7 Drawing Sheets

(51) Int. Cl.
*H01G 4/232* (2006.01)
*H01G 4/30* (2006.01)

(56) References Cited

U.S. PATENT DOCUMENTS

| | | | | | |
|---|---|---|---|---|---|
| 2007/0025055 | A1* | 2/2007 | Mizuno | H01G 4/015 | 361/303 |
| 2008/0212257 | A1* | 9/2008 | Sakamoto | H01G 4/012 | 29/25.42 |
| 2012/0099241 | A1* | 4/2012 | Chang | H01G 4/012 | 361/301.4 |
| 2023/0268124 | A1* | 8/2023 | Takeguchi | H01G 4/012 | 361/301.4 |
| 2025/0182966 | A1* | 6/2025 | Goto | H01G 4/012 | |

FOREIGN PATENT DOCUMENTS

| | | | | | |
|---|---|---|---|---|---|
| JP | 2006-332334 | | | 12/2006 | |
| JP | 2007-035850 | | | 2/2007 | |
| KR | 20200004020 | A | * | 1/2020 | H01G 4/30 |
| KR | 20220098507 | A | * | 7/2022 | H01G 4/012 |
| KR | 20230124372 | A | * | 8/2023 | H01G 4/1209 |
| WO | WO-2023136258 | A1 | * | 7/2023 | H01G 4/008 |

* cited by examiner

MULTILAYER CERAMIC ELECTRONIC COMPONENT

CROSS-REFERENCE TO RELATED APPLICATIONS

This patent application is based on and claims priority to Japanese Patent Application No. 2023-202590 filed on Nov. 30, 2023, the entire contents of which are incorporated herein by reference.

TECHNICAL FIELD

The present disclosure relates to a multilayer ceramic electronic component.

BACKGROUND

Multilayer ceramic capacitors are used for noise bypass, voltage stabilization, and the like in high-frequency circuits and power circuits. The multilayer ceramic capacitor mainly includes a capacitance formation portion in which multiple internal electrodes and dielectric layers are alternately laminated, a pair of external electrodes covering a pair of end surfaces of the capacitance formation portion, margins covering a pair of side surfaces of the capacitance formation portion, and covers covering a pair of main surfaces of the capacitance formation portion.

RELATED ART DOCUMENT

Patent Document

[Patent Document 1] Japanese Laid-open Patent Application Publication No. H11-340083
[Patent Document 2] Japanese Laid-open Patent Application Publication No. 2006-332334
[Patent Document 3] Japanese Laid-open Patent Application Publication No. 2007-35850

SUMMARY

According to one aspect of the present disclosure, a multilayer ceramic electronic component includes a laminate including an internal electrode group including a plurality of internal electrodes laminated along a first axis, and a plurality of ceramic layers, each of which is located between adjacent internal electrodes among the plurality of internal electrodes; and a pair of external electrodes connected to the plurality of internal electrodes. The internal electrode group includes: a first internal electrode group including one or more first internal electrodes located at an end in a first direction of the first axis among the plurality of internal electrodes; a second internal electrode group including one or more second internal electrodes located at an end in a second direction opposite to the first direction of the first axis among the plurality of internal electrodes; and a third internal electrode group including one or more third internal electrodes located between the first internal electrode group and the second internal electrode group among the plurality of internal electrodes. A first thermal expansion coefficient of the one or more first internal electrodes and a second thermal expansion coefficient of the one or more second internal electrodes are less than a third thermal expansion coefficient of the one or more third internal electrodes.

DETAILED DESCRIPTION

Figure 1:
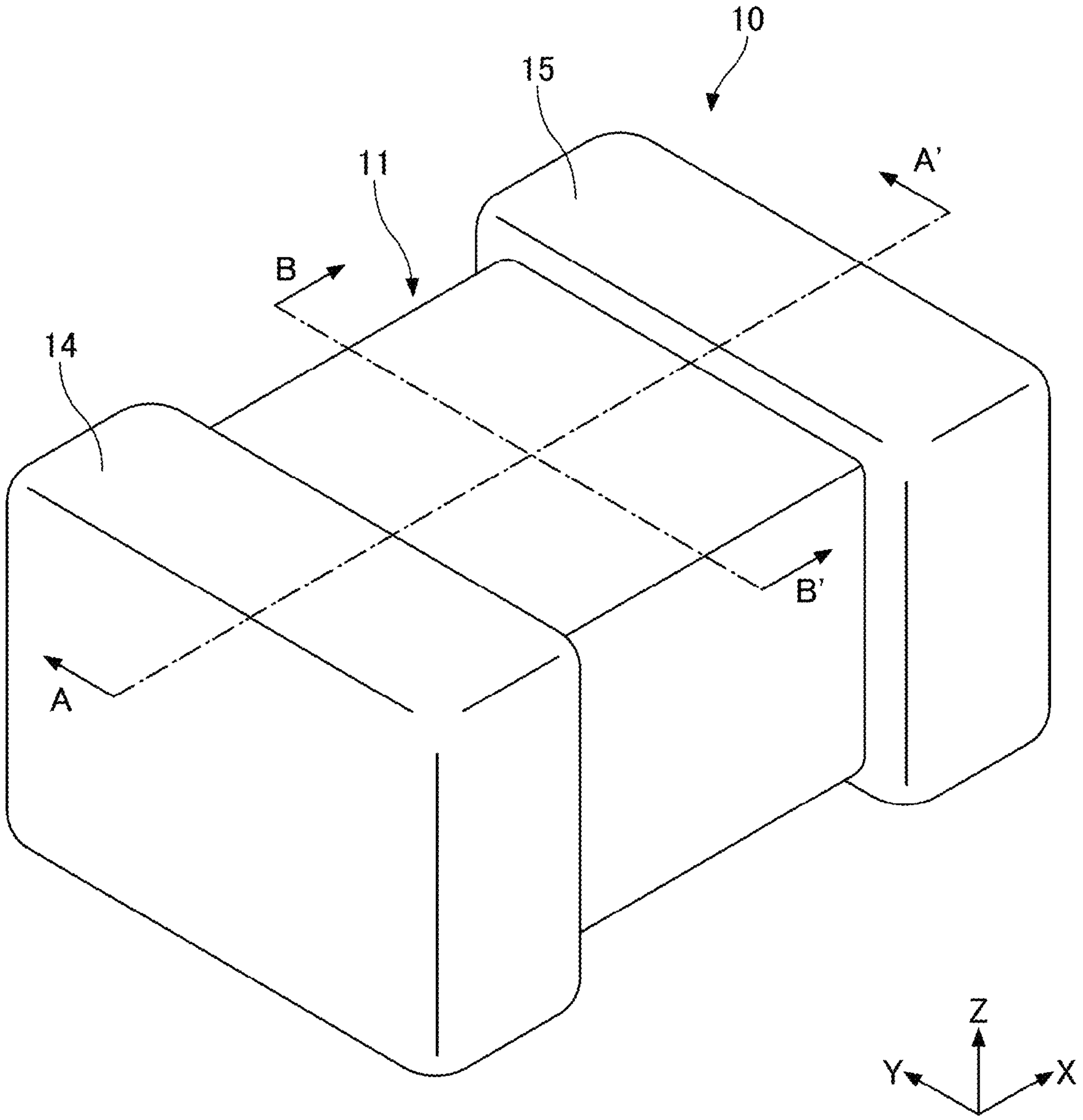
FIG. 1 is a perspective view illustrating a multilayer ceramic capacitor according to a first embodiment.

When a voltage is applied to the internal electrodes of the multilayer ceramic capacitor, the capacitance formation portion tends to extend in the lamination direction of the internal electrodes and the dielectric layers due to the piezoelectric effect of the dielectric layers. In contrast, the margin does not tend to deform because the piezoelectric effect does not act on the margin. Therefore, a tensile stress acts on the margin, and a crack starting from the boundary between the capacitance formation portion and the margin may be caused. In the present disclosure, such a crack may be referred to as an electrostriction crack.

Additionally, the multilayer ceramic capacitor may be used by being mounted on a substrate by using solder. In this case, the multilayer ceramic capacitor is exposed to a temperature greater than or equal to the melting point of the solder, for example, a temperature of about 300° C. to 400° C., during soldering for mounting. When the multilayer ceramic capacitor is exposed to a temperature greater than or equal to the melting point of the solder, while the internal electrodes and the external electrodes thermally expand to a large extent, the margins and the covers thermally expand to a small extent. Therefore, a crack starting from a portion of the cover that is in contact with the edge of the external electrode may be caused. In the present disclosure, such a crack may be referred to as a thermal crack.

In a multilayer ceramic capacitor in the related art, it is difficult to suppress both electrostriction cracking and thermal cracking.

According to the present disclosure, electrostriction cracking and thermal cracking can be suppressed.

In the following, embodiments of the present disclosure will be described in detail, but the present disclosure is not limited thereto. Here, in the present specification and the drawings, components having substantially the same functional configurations are denoted by the same reference symbols, and duplicated description thereof may be omitted. Additionally, in the drawings, the X axis, the Y axis, and the Z axis orthogonal to each other are appropriately illustrated. The X axis, the Y axis, and the Z axis define a fixed coordinate system fixed with respect to a multilayer ceramic capacitor.

First Embodiment

First, a first embodiment will be described. The first embodiment relates to a multilayer ceramic capacitor.

Structure of Multilayer Ceramic Capacitor

Figure 2:
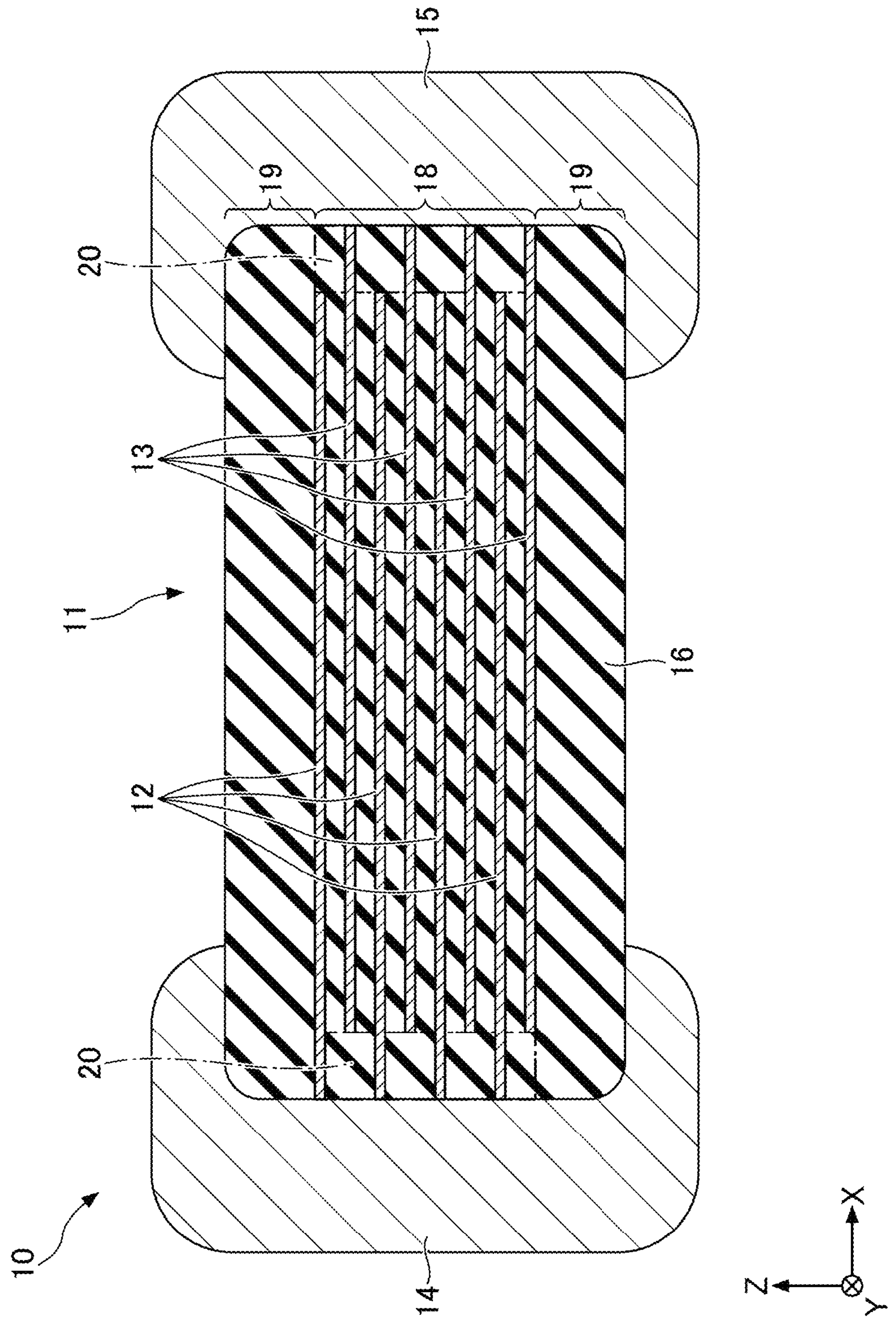
FIG. 2 is a first cross-sectional view illustrating the multilayer ceramic capacitor according to the first embodiment.
Figure 3:
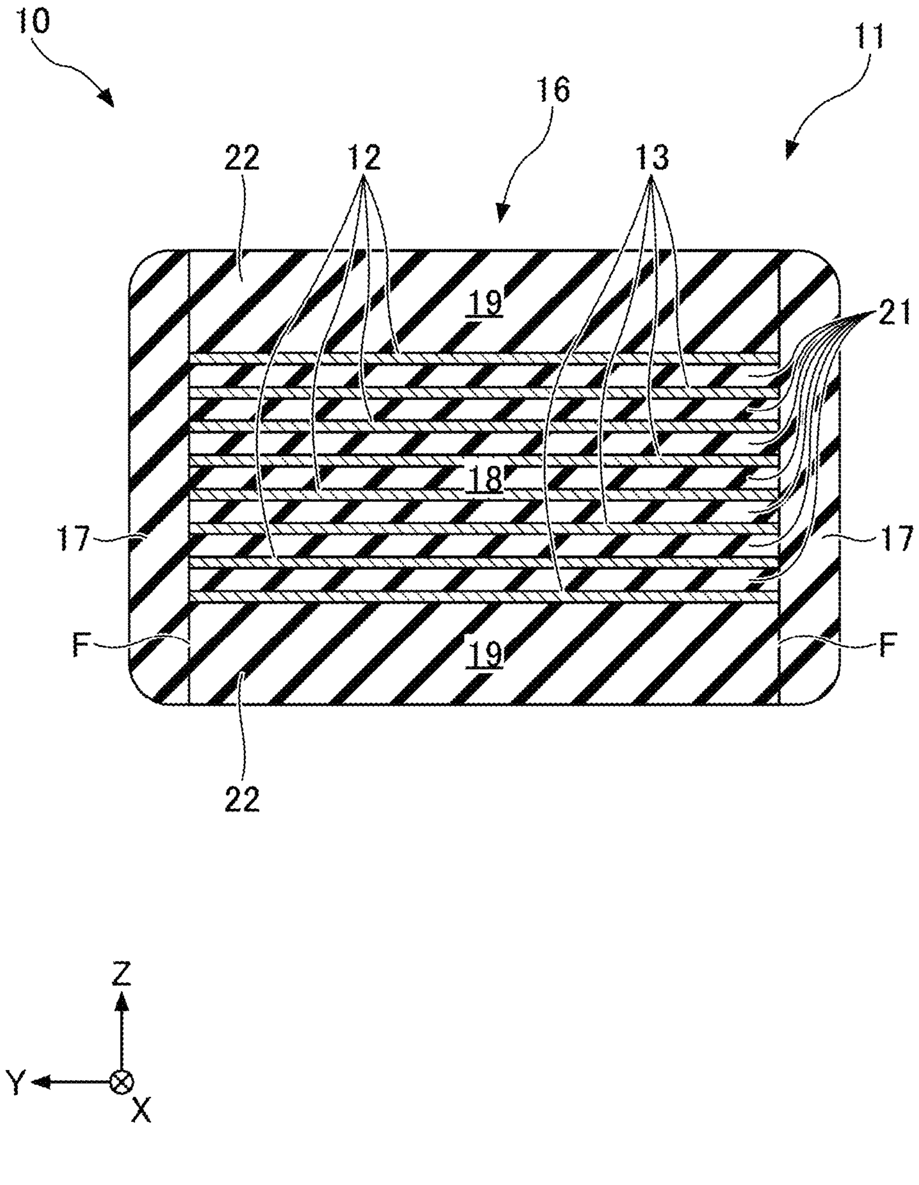
FIG. 3 is a second cross-sectional view illustrating the multilayer ceramic capacitor according to the first embodiment.

FIG. 1 is a perspective view illustrating a multilayer ceramic capacitor according to the first embodiment. FIG. 2 and FIG. 3 are cross-sectional views illustrating the multilayer ceramic capacitor according to the first embodiment. FIG. 2 is a cross-sectional view taken along the line A-A' in FIG. 1. FIG. 3 is a cross-sectional view taken along the line B-B' in FIG. 1.

A multilayer ceramic capacitor 10 according to the first embodiment includes a ceramic body 11, an external electrode 14 having a first polarity, and an external electrode 15 having a second polarity. The ceramic body 11 is formed in a hexahedron shape having a pair of end surfaces orthogonal to the X axis, a pair of side surfaces orthogonal to the Y axis, and a pair of main surfaces orthogonal to the Z axis. In the example in FIG. 1 to FIG. 3, the external electrode 14 and the external electrode 15 cover the pair of end surfaces of the ceramic body 11. The external electrodes may be provided on any surfaces of the ceramic body 11, which are not limited to the end surfaces.

The pair of end surfaces, the pair of side surfaces, and the pair of main surfaces of the ceramic body 11 are all flat surfaces. The flat surface in the present embodiment is not required to be strictly flat as long as it is recognized as flat when viewed as a whole, and includes, for example, a surface having a minute uneven shape of the surface, a gently curved shape present in a predetermined range, and the like.

In the example in FIG. 1 to FIG. 3, the external electrode 14 and the external electrode 15 are opposed to each other along the X axis with the ceramic body 11 being sandwiched between the external electrode 14 and the external electrode 15. The external electrode 14 and the external electrode 15 respectively extend from the end surfaces of the ceramic body 11 toward the main surfaces and the side surfaces. With this, in the external electrode 14 and the external electrode 15, both of a cross section parallel to the X-Z plane and a cross section parallel to the X-Y plane have a U shape.

Here, the shapes of the external electrode 14 and the external electrode 15 are not limited to those illustrated in FIG. 1. For example, the external electrode 14 and the external electrode 15 may respectively extend from both end surfaces of the ceramic body 11 toward only one main surface, and the cross section parallel to the X-Z plane may have an L shape. Additionally, the external electrode 14 and the external electrode 15 is not required to extend toward any of the main surfaces and the side surfaces. For example, both of the two external electrodes may be provided on one main surface at a distance from each other. The external electrodes are not limited to the form in FIG. 1 as long as they are provided on any surface of the ceramic body 11 so as to be spaced apart from each other.

The external electrode 14 and the external electrode 15 are made of a good conductor of electricity. Examples of the good conductor of electricity forming the external electrode 14 and the external electrode 15 include a metal or an alloy containing copper (Cu), nickel (Ni), tin (Sn), palladium (Pd), platinum (Pt), silver (Ag), gold (Au), and the like as a main component. Here, in the present embodiment, the main component refers to a component having the highest content ratio.

The ceramic body 11 includes a laminate 16 and a pair of side margins 17. The laminate 16 has a pair of side surfaces F that are parallel to a first axis, which is the lamination direction, and are in contact with the pair of side margins 17. In the example of FIG. 1 to FIG. 3, the laminate 16 forms the pair of main surfaces and the pair of end surfaces of the ceramic body 11 and has the side surfaces F that are in contact with the pair of side margins 17 perpendicularly to the Y axis. The pair of side margins 17 respectively cover the pair of side surfaces F of the laminate 16, and a pair of surfaces opposed to the covering surfaces of the side margins 17 form a pair of surfaces of the ceramic body 11.

The laminate 16 has a configuration in which multiple ceramic layers having a flat plate shape and extending along a plane perpendicular to the first axis, which is the lamination direction, are laminated along the first axis. The laminate 16 includes a capacitance formation portion 18 and a pair of covers 19. The pair of covers 19 covers the capacitance formation portion 18 from above and below along the first axis, and forms a pair of surfaces of the ceramic body 11. The multiple ceramic layers include multiple inter-electrode ceramic layers 21 included in the capacitance formation portion 18 and a pair of outermost ceramic layers 22 included in the pair of covers 19. The capacitance formation portion 18 is sandwiched between the pair of outermost ceramic layers along the first axis. That is, in the example of FIG. 1, the laminate 16 has a configuration in which multiple ceramic layers having a flat plate shape and extending along the X-Y plane perpendicular to the Z-axis, which is the lamination direction, are laminated along the Z-axis. The laminate 16 includes the capacitance formation portion 18 and the pair of covers 19. The pair of covers 19 covers the capacitance formation portion 18 from above and below along the Z-axis, and forms the pair of main surfaces of the ceramic body 11. The multiple ceramic layers include the multiple inter-electrode ceramic layers 21 included in the capacitance formation portion 18 and the pair of outermost ceramic layers 22 included in the pair of covers 19. The capacitance formation portion 18 is sandwiched between the pair of outermost ceramic layers along the Z-axis.

The capacitance formation portion 18 includes multiple internal electrodes 12 having the first polarity and multiple internal electrodes 13 having the second polarity. The internal electrode 12 and the internal electrode 13 are formed in a sheet shape and extend along a plane perpendicular to the first axis, which is the lamination direction, that is, the X-Y plane in the example of FIG. 1. The internal electrodes 12 and the internal electrodes 13 are arranged between multiple ceramic layers. The internal electrodes 12 and the internal electrodes 13 are alternately arranged along the first axis, which is the lamination direction, i.e., along the Z axis in the example of FIG. 1. That is, in the capacitance formation portion 18, the internal electrode 12 and the internal electrode 13 are opposed to each other with the ceramic layer being sandwiched between the internal electrode 12 and the internal electrode 13 along the first axis, which is the lamination direction, i.e., the Z axis in the example of FIG. 1.

The internal electrodes 12 are drawn out to the surface of the ceramic body 11, i.e., the end surface in the example of FIG. 1, covered by the external electrode 14. With respect to the above, the internal electrodes 13 are drawn out to the surface of the ceramic body 11, i.e., the end surface in the example of FIG. 1, covered by the external electrode 15. With this, the internal electrode 12 is connected only to the external electrode 14, and the internal electrode 13 is connected only to the external electrode 15.

The capacitance formation portion 18 is adjacent to the pair of side margins in the direction perpendicular to the first axis, which is the lamination direction, on both of the side surfaces F of the capacitance formation portion 18, and the internal electrodes 12 and the internal electrodes 13 may be formed so as to be in contact with the side margins in the direction perpendicular to the first axis, which is the lamination direction, of the capacitance formation portion 18, and both ends of the internal electrodes 12 and the internal electrodes 13 may be located on both the side surfaces F of the laminate 16.

The internal electrode 12 and the internal electrode 13 are made of a good conductor of electricity. Examples of the good conductor of electricity forming the internal electrode 12 and the internal electrode 13 typically include nickel (Ni) or an alloy containing nickel as a main component.

With such a configuration, in the multilayer ceramic capacitor 10, when a voltage is applied between the external electrodes 14 and the external electrodes 15, the voltage is applied to the multiple inter-electrode ceramic layers 21 between the internal electrodes 12 and the internal electrodes 13. With this, in the multilayer ceramic capacitor 10, electric charge corresponding to the voltage between the external electrode 14 and the external electrode 15 is stored.

In the ceramic body 11 of the multilayer ceramic capacitor 10, each of the multiple ceramic layers forming the capacitance formation portion 18, the pair of covers 19, and the pair of side margins 17 includes a polycrystalline substance of the dielectric ceramic material as a main component. In the ceramic body 11, the ceramic forming any of the above-described portions preferably have the same composition.

In the ceramic body 11, a dielectric ceramic having a high dielectric constant is used to increase the capacitance of the ceramic layers of the capacitance formation portion 18. Examples of the dielectric ceramic having a high dielectric constant include a material having a perovskite structure containing barium (Ba) and titanium (Ti), which is represented by barium titanate ($BaTiO_3$).

Here, the ceramic layers may be made of a composition system such as strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), or titanium dioxide ($TiO_2$).

Figure 4:
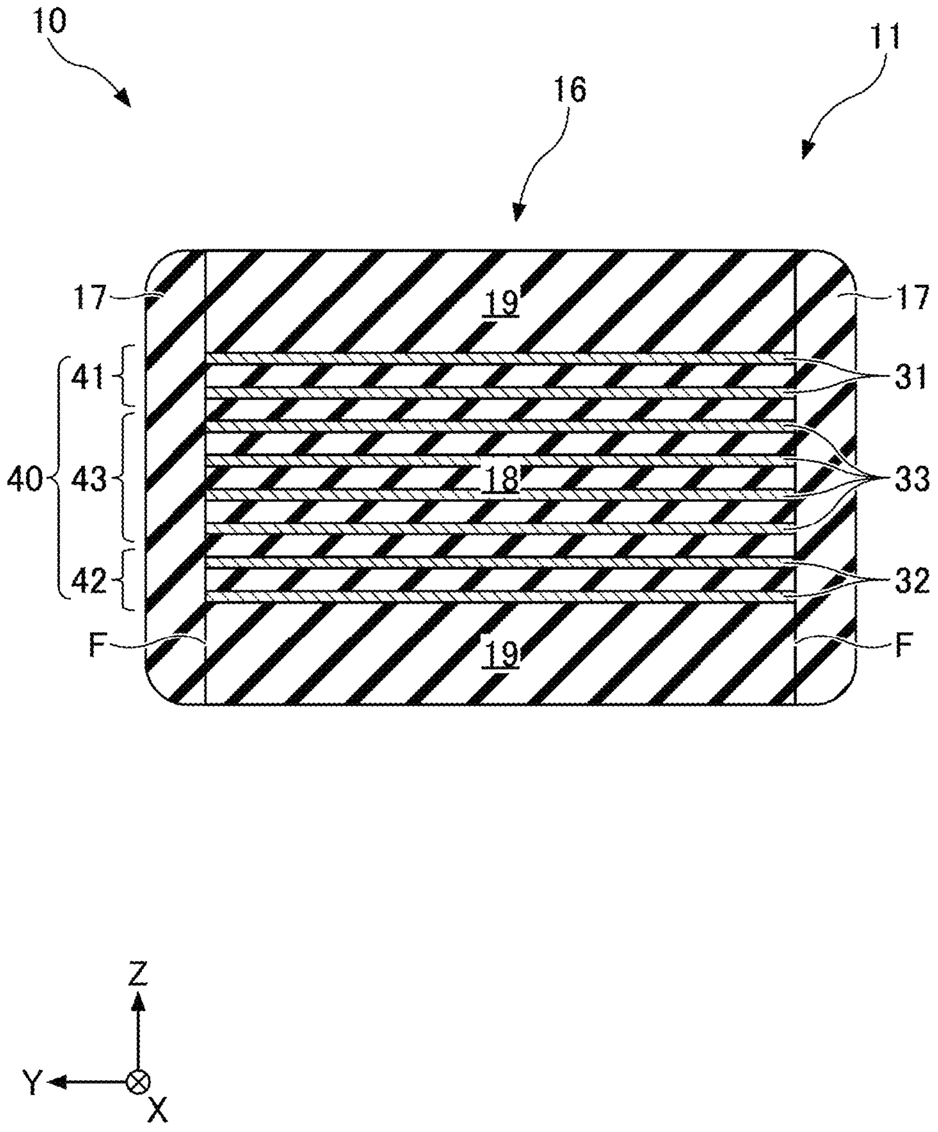
FIG. 4 is a view illustrating internal electrode groups in which internal electrodes are divided in terms of the thermal expansion coefficient in the first embodiment.

Here, the thermal expansion coefficient of the internal electrode 12 and the internal electrode 13 will be described. FIG. 4 is a view illustrating internal electrode groups, in which the internal electrodes 12 and the internal electrodes 13 are divided, in terms of the thermal expansion coefficient in the first embodiment.

The multiple internal electrodes 12 and 13 included in the laminate 16 form an internal electrode group 40. The internal electrode group 40 includes a first internal electrode group 41, a second internal electrode group 42, and a third internal electrode group 43. The first internal electrode group 41 includes one or more first internal electrodes 31 located at an end in a first direction (positive side) of the first axis, which is the lamination direction, i.e., the Z axis in the example of FIG. 4. The second internal electrode group 42 includes one or more second internal electrodes 32 located at an end in a second direction (negative side) opposite to the first direction of the first axis, which is the lamination direction, i.e., the Z-axis in the example of FIG. 4. The third internal electrode group 43 includes one or more third internal electrodes 33 located between the first internal electrode group 41 and the second internal electrode group 42. Each of the first internal electrode 31, the second internal electrode 32, and the third internal electrode 33 is either the internal electrode 12 or the internal electrode 13.

In the first embodiment, a third thermal expansion coefficient of the third internal electrode 33 is greater than a first thermal expansion coefficient of the first internal electrode 31 and a second thermal expansion coefficient of the second internal electrode 32. For example, the first internal electrode 31 and the second internal electrode 32 are made of nickel, and the third internal electrode 33 is made of an alloy containing nickel as a main component. Specifically, the third internal electrode 33 contains, for example, nickel as a main component and at least one additional element selected from the group consisting of indium, zinc, aluminum, tin, manganese, silver, copper, and gold. The proportion of the at least one additional element in the third internal electrodes 33 is, for example, 0.2 at % or greater and 3.0 at % or less. For example, the third thermal expansion coefficient is greater than the thermal expansion coefficient of nickel.

[Method of Manufacturing Multilayer Ceramic Capacitor]

Figure 5:
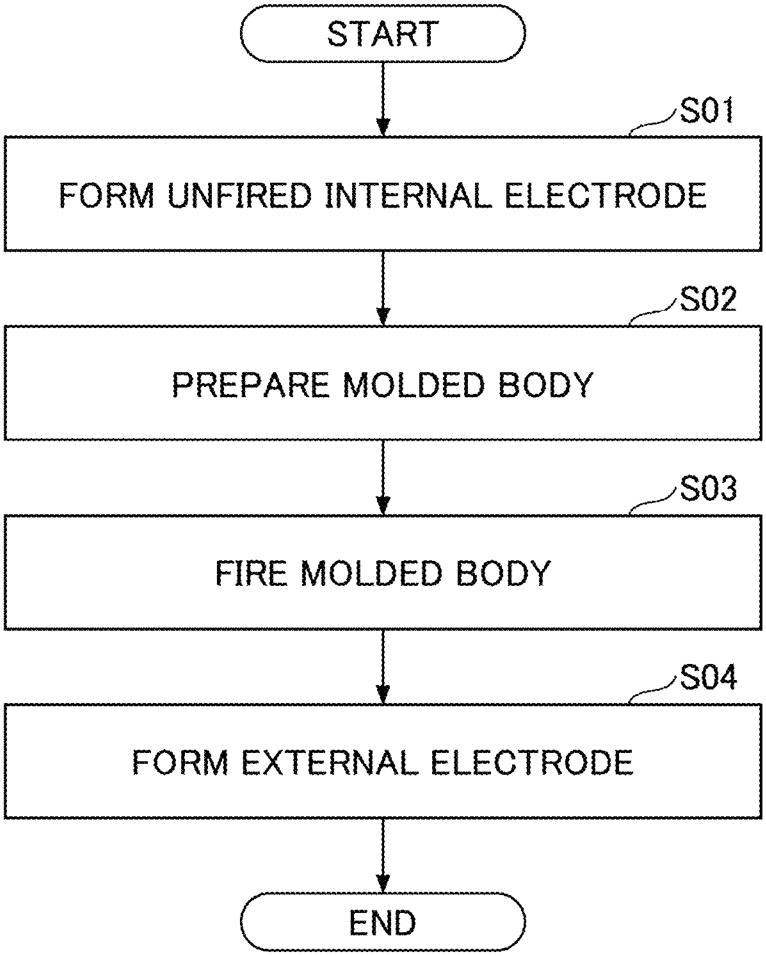
FIG. 5 is a flowchart illustrating a method of manufacturing the multilayer ceramic capacitor according to the first embodiment.

Next, a method of manufacturing the multilayer ceramic capacitor 10 will be described. FIG. 5 is a flowchart illustrating the method of manufacturing the multilayer ceramic capacitor 10 according to the first embodiment.

(Step S01: Formation of Unfired Internal Electrode)

An unfired ceramic sheet is prepared. A ceramic material is mixed with a binder, a solvent, and the like, and is coated on a film made of polyethylene terephthalate (PET) or the like by using an appropriate coating machine using a doctor blade method or the like, and dried to obtain the unfired ceramic sheet. The unfired internal electrodes 12 or the unfired internal electrodes 13 are formed in an appropriate pattern on the unfired ceramic sheet by an appropriate method, such as a screen printing method or a sputtering method. Peripheral portions around the appropriate pattern of the unfired internal electrodes 12 or the unfired internal electrodes 13 of the ceramic sheet become the side margins 17 and end margins 20 after firing. In order to absorb the difference in thickness between the unfired internal electrodes 12 and 13, a step compensation pattern made of a ceramic material may be provided or may not be provided in the peripheral portions of the appropriate pattern. The screen printing method, T sputtering method, or the like can also be used to form the step compensation pattern as appropriate.

For example, portions to be the first internal electrode 31 and the second internal electrode 32 after firing contain Ni as a main component, and a portion to be the third internal electrode 33 after firing is formed of an alloy containing Ni as a main component, having a thermal expansion coefficient greater than the thermal expansion coefficient of the portion to be the first internal electrode 31 and the portion to be the second internal electrode 32.

(Step S02: Preparation of Molded Body)

In step S02, a molded body that is the unfired ceramic body 11 is prepared. The molded body includes the unfired laminate 16 and the unfired side margins 17. The unfired laminate 16 and the unfired side margins 17 can be produced using a laminated sheet in which multiple large-sized ceramic sheets are laminated along the first axis, which is the lamination direction, in this example, the Z axis. The ceramic sheets including the unfired internal electrodes 12 formed in step S01 and the ceramic sheets including the unfired internal electrodes 13 formed in step S01 are alternately laminated, and a portion to be the first internal electrode 31 after firing, a portion to be the second internal electrode 32 after firing, and a portion to be the third internal electrode 33 after firing are laminated. Further, a portion to be the unfired cover 19 is laminated using the ceramic sheet including no unfired internal electrodes in the upper and lower sides in the first axial direction, which is the lamination direction thereof, in this example, the Z axis. These respective portions are bonded by thermocompression bonding to obtain the unfired molded body. The portions to be the first internal electrode 31, the second internal electrode 32, the third internal electrode 33, and the cover 19 after firing may be consistently and continuously laminated without being individually laminated. The molded body includes a portion corresponding to the laminate 16 including a portion corresponding to the capacitance formation portion 18 after firing, in which the internal electrodes are alternately laminated, portions corresponding to the pair of covers 19 after firing, in which the ceramic sheets are laminated, and portions corresponding to the side margins 17 after firing on both side surfaces of the laminate 16.

The side margins 17 may be formed independently of the laminate 16. In this case, a pattern unformed portion is not formed in the peripheral portion around the pattern of the unfired internal electrode, and the internal electrode is exposed on the side surface of the molded body. A paste or sheet made of a ceramic material is attached thereto, so that the molded body can be obtained. Existing methods can be used appropriately except for the formation of the portions to be the first internal electrode 31, the second internal electrode 32, and the third internal electrode 33.

(Step S03: Firing)

In step S03, the ceramic body 11 obtained in step S02 is fired to produce the ceramic body 11 of the multilayer ceramic capacitor 10 illustrated in FIG. 1 to FIG. 3.

(Step S04: Formation of External Electrode)

In step S04, the external electrode 14 and the external electrode 15 are formed on the ends of the ceramic body 11 fired in step S03 in both directions along the X-axis to produce the multilayer ceramic capacitor 10 illustrated in FIG. 1 to FIG. 3. The method of forming the external electrode 14 and the external electrode 15 in step S04 can be suitably selected from known methods. The external electrode 14 and the external electrode 15 may be formed on the surfaces of the molded body before firing and be fired with the molded body.

Then, the multilayer ceramic capacitor 10 illustrated in FIG. 1 to FIG. 3 is completed.

In the multilayer ceramic capacitor 10 according to the first embodiment, the first internal electrode 31, the second internal electrode 32, and the third internal electrode 33 thermally shrink more than the dielectric ceramic during cooling in the firing of step S03, and thus an internal stress in the compression direction acts on the capacitance formation portion 18. Additionally, the third thermal expansion coefficient of the third internal electrode 33 is greater than the first thermal expansion coefficient of the first internal electrode 31 and the second thermal expansion coefficient of the second internal electrode 32, and thus a strong internal stress acts particularly on a portion around the third internal electrode group 43. Therefore, even when a voltage is applied between the internal electrode 12 and the internal electrode 13 and the inter-electrode ceramic layer 21 tries to extend along the Z axis due to the piezoelectric effect, the deformation of the inter-electrode ceramic layer 21 is suppressed by the internal stress in the compression direction along the Z axis. As a result, the deformation of the capacitance formation portion 18 along the Z-axis is suppressed, and electrostriction cracking caused by the thermal expansion of the capacitance formation portion 18 can be suppressed. For example, electrostriction cracking can be reduced in comparison with the case where all of the first internal electrode, the second internal electrode, and the third internal electrode are made of nickel.

The internal electrode 12 and the internal electrode 13 can be formed using a conductive paste, but are preferably formed by the sputtering method. This is because the sputtering method allows the internal electrodes 12 and the internal electrodes 13 to be formed with more excellent uniformity, and thus the uniformity of the internal stress generated in the capacitance formation portion 18 is improved, and electrostriction cracking is more easily suppressed.

Here, if the purpose is to suppress electrostriction cracking only, it is conceivable that the first internal electrode 31 and the second internal electrode 32 are made of a material containing nickel as a main component and at least one additional element selected from the group consisting of indium, zinc, aluminum, tin, manganese, silver, copper, and gold, as the third internal electrode 33 is. However, in this case, although electrostriction cracking can be suppressed, the first internal electrode 31 and the second internal electrode 32 thermally expand greatly when mounted on a substrate, and thermal cracking is more likely to occur.

With respect to the above, according to the first embodiment, thermal expansion of the first internal electrodes 31 and the second internal electrodes 32 located near the cover 19 does not increase when the multilayer ceramic capacitor 10 is mounted on a substrate, and thus thermal cracking can be suppressed.

Second Embodiment

Figure 6:
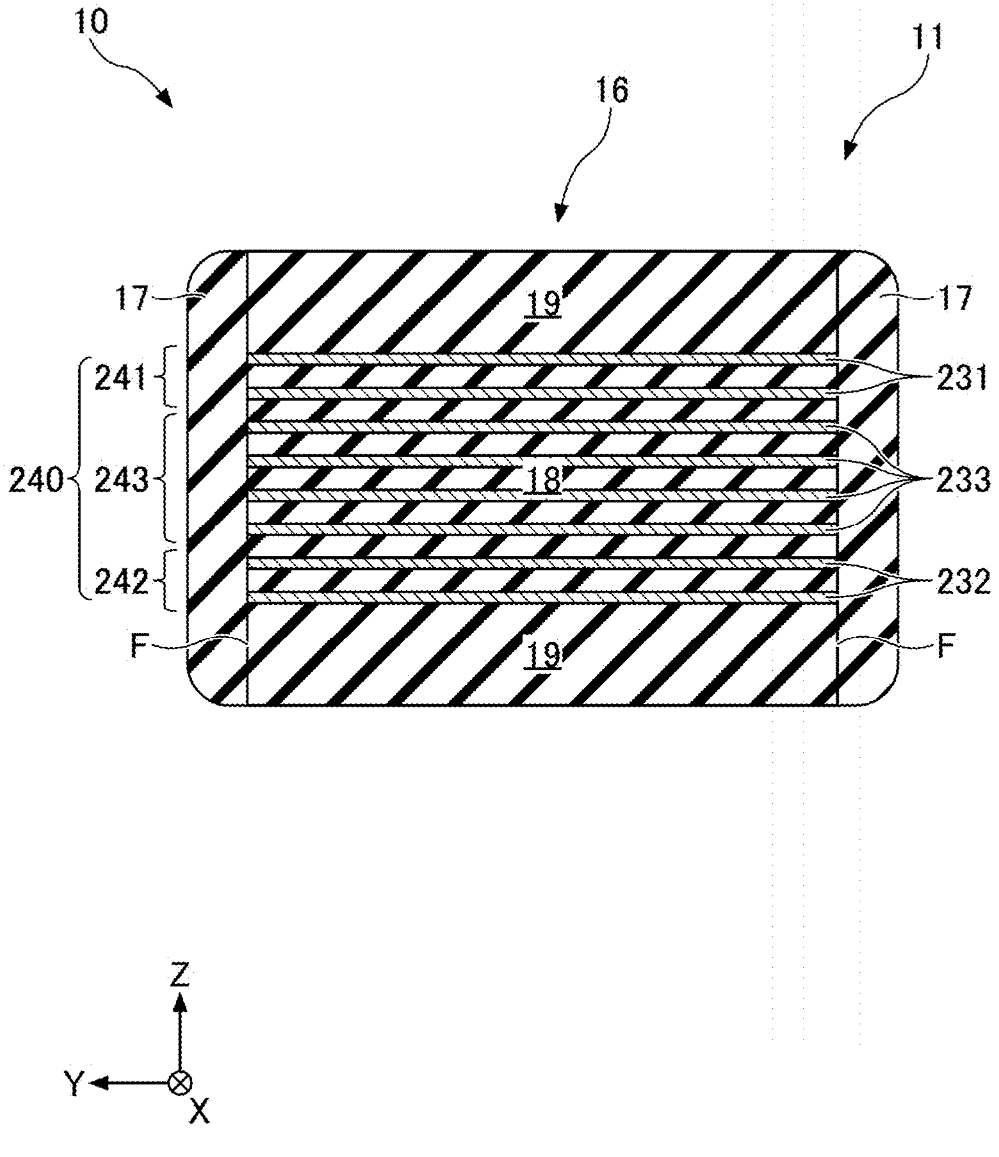
FIG. 6 is a view illustrating internal electrode groups in which internal electrodes are divided in terms of the thermal expansion coefficient in a second embodiment.

Next, a second embodiment will be described. The second embodiment is different from the first embodiment mainly in the materials of the internal electrode groups. FIG. 6 is a view illustrating internal electrode groups, in which the internal electrodes 12 and the internal electrodes 13 are divided, in terms of the thermal expansion coefficient in the second embodiment.

In the second embodiment, the multiple internal electrodes 12 and 13 included in the laminate 16 form an internal electrode group 240. The internal electrode group 240 includes a first internal electrode group 241 instead of the first internal electrode group 41, a second internal electrode group 242 instead of the second internal electrode group 42, and a third internal electrode group 243 instead of the third internal electrode group 43. The first internal electrode group 241 includes one or more first internal electrodes 231 located at the end in the first direction (positive side) of the first axis, which is the lamination direction, i.e., the Z axis in the example of FIG. 6. The second internal electrode group 242 includes one or more second internal electrodes 232 located at the end in the second direction (negative side) opposite to the first direction of the first axis, which is the lamination direction, i.e., the Z-axis in the example of FIG. 6. The third internal electrode group 243 includes one or more third internal electrodes 233 located between the first internal electrode group 241 and the second internal electrode group 242. Each of the first internal electrode 231, the second internal electrode 232, and the third internal electrode 233 is either the internal electrode 12 or the internal electrode 13.

In the second embodiment, the first thermal expansion coefficient of the first internal electrode 231 and the second thermal expansion coefficient of the second internal electrode 232 are less than the third thermal expansion coefficient of the third internal electrode 233. However, the materials are different from those of the first embodiment, and for example, the first internal electrode 231 and the second internal electrode 232 are made of an alloy containing nickel as a main component, and the third internal electrode 233 is made of nickel. Specifically, the first internal electrode 231 and the second internal electrode 232 contain, for example, nickel as a main component and at least one additional element selected from the group consisting of palladium, yttrium, platinum, titanium, vanadium, niobium, tantalum, germanium, hafnium, zirconium, silicon, and gallium. The proportion of the additive element in the first internal electrodes 231 and the second internal electrodes 232 is, for example, 0.2 at % or greater and 3.0 at % or less. For example, the first thermal expansion coefficient and the second thermal expansion coefficient are less than the thermal expansion coefficient of nickel.

The other configurations of the second embodiment are substantially the same as those of the first embodiment.

In the manufacture of the multilayer ceramic capacitor according to the second embodiment, it is only necessary to change the unfired materials of the portions to be the first internal electrode 231, the second internal electrode 232, and the third internal electrode 233 from the unfired materials of the portions to be the first internal electrode 31, the second internal electrode 32, and the third internal electrode 33 in the first embodiment. For example, the portion to be the third internal electrode 233 after firing contains Ni as a main substance, and the portion to be the first internal electrode 231 after firing and the portion to be the second internal electrode 232 after firing are made of an alloy contains Ni as a main substance, having a thermal expansion coefficient less than that of the portion to be the third internal electrode 233 after firing.

In the multilayer ceramic capacitor according to the second embodiment, the first thermal expansion coefficient of the first internal electrode 231 and the second thermal expansion coefficient of the second internal electrode 232 are less than the third thermal expansion coefficient of the third internal electrode 233, and thus the thermal expansion of the first internal electrode 231 and the second internal electrode 232 located near the covers 19 is particularly reduced when the multilayer ceramic capacitor is mounted on a substrate. As a result, thermal cracking can be suppressed.

Here, if the purpose is to suppress thermal cracking only, it is conceivable that the third internal electrode 233 is made of a material containing nickel as a main component and at least one additive element selected from the group consisting of palladium, yttrium, platinum, titanium, vanadium, niobium, tantalum, germanium, hafnium, zirconium, silicon, and gallium, as the first internal electrode 231 and the second internal electrode 232 are. However, in this case, although thermal cracking can be suppressed, the internal stress in the compression direction of the capacitance formation portion 18 is reduced, and electrostriction cracking is more likely to occur.

With respect to the above, according to the second embodiment, a sufficient internal stress in the compression direction acts on the capacitance formation portion 18, and thus electrostriction cracking can be suppressed.

In general, the Young's modulus of an alloy that contains nickel as a main component and has a thermal expansion coefficient less than that of nickel is less than the Young's modulus of nickel. In the second embodiment, the Young's modulus of the first internal electrode 231 and the Young's modulus of the second internal electrode 232 are preferably less than the Young's modulus of nickel. A substrate on which the multilayer ceramic capacitor is mounted may be bent by an external stress, a thermal stress, or the like. When the substrate is bent, a stress acts on the multilayer ceramic capacitor through the solder, and when the internal electrode is largely deformed, a crack may occur in the cover or the like as the thermal crack does. In the present disclosure, such a crack may be referred to as a substrate bending crack.

When the Young's modulus of the first internal electrode 231 and the Young's modulus of the second internal electrode 232 are less than the Young's modulus of nickel, even if the substrate is bent, the first internal electrode 231 and the second internal electrode 232 are less likely to be deformed. Therefore, when the Young's modulus of the first internal electrode 231 and the Young's modulus of the second internal electrode 232 are less than the Young's modulus of nickel, substrate bending cracking is also easily suppressed.

Third Embodiment

Figure 7:
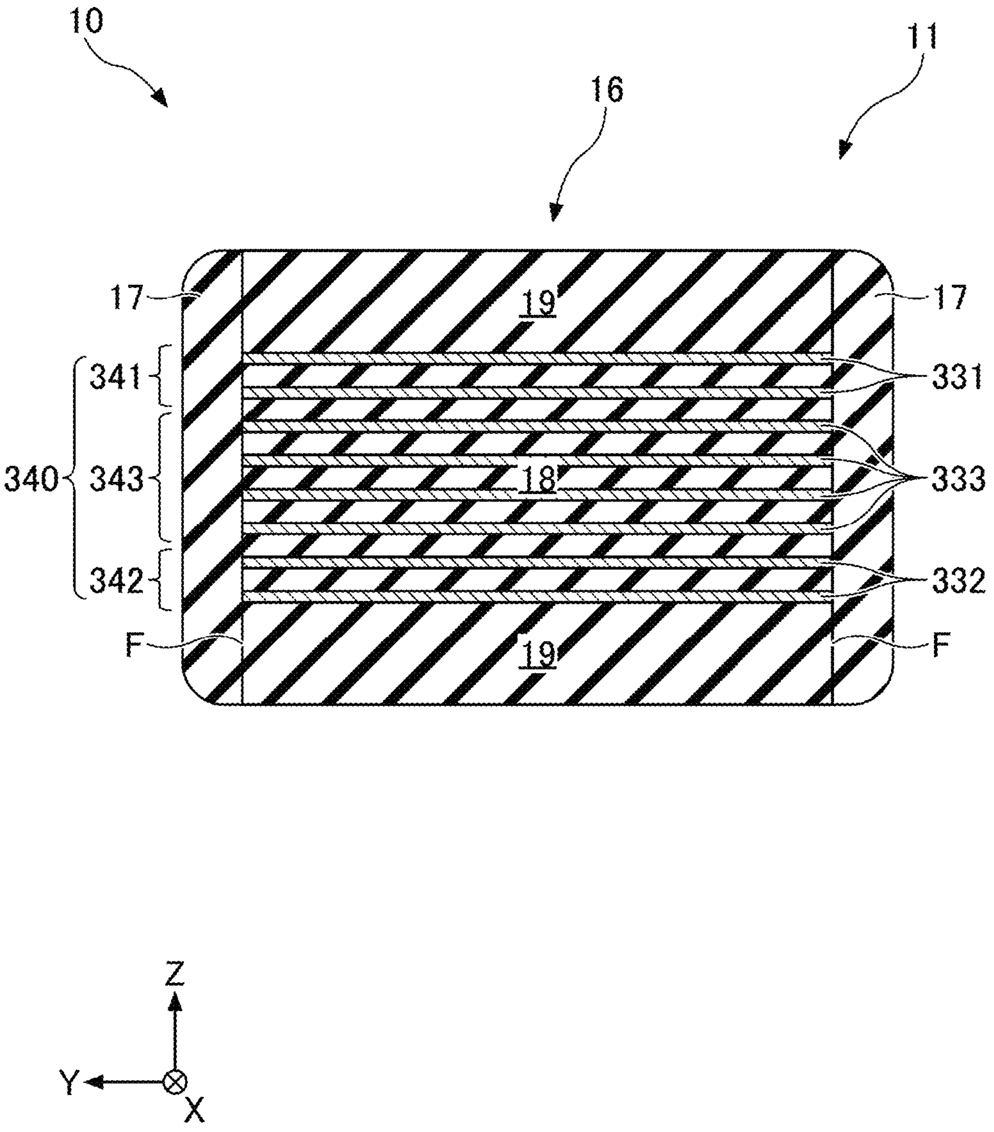
FIG. 7 is a view illustrating internal electrode groups in which internal electrodes are divided in terms of the thermal expansion coefficient in a third embodiment.

Next, a third embodiment will be described. The third embodiment is different from the first embodiment mainly in the materials of the internal electrode groups. FIG. 7 is a view illustrating internal electrode groups, in which the internal electrodes 12 and the internal electrodes 13 are divided, in terms of the thermal expansion coefficient in the third embodiment.

In the third embodiment, the multiple internal electrodes 12 and 13 included in the laminate 16 form an internal electrode group 340. The internal electrode group 340 includes a first internal electrode group 341 instead of the first internal electrode group 41, a second internal electrode group 342 instead of the second internal electrode group 42, and a third internal electrode group 343 instead of the third internal electrode group 43. The first internal electrode group 341 includes one or more first internal electrodes 331 located at the end in the first direction (positive side) of the first axis, which is the lamination direction, i.e., the Z axis in the example of FIG. 7. The second internal electrode group 342 includes one or more second internal electrodes 332 located at the end in the second direction (negative side) opposite to the first direction of the first axis, which is the lamination direction, i.e., the Z-axis in the example of FIG. 7. The third internal electrode group 343 includes one or more third internal electrodes 333 located between the first internal electrode group 341 and the second internal electrode group 342. Each of the first internal electrode 331, the second internal electrode 332, and the third internal electrode 333 is either the internal electrode 12 or the internal electrode 13.

In the third embodiment, the first thermal expansion coefficient of the first internal electrode 331 and the second thermal expansion coefficient of the second internal electrode 332 are less than the third thermal expansion coefficient of the third internal electrode 333. However, the materials are different from those of the first embodiment, and for example, the first internal electrode 331 and the second internal electrode 332 are made of an alloy containing nickel as a main component, which is the same as that of the first internal electrode 231 and the second internal electrode 232 of the second embodiment. With respect to the above, the third internal electrode 333 is made of an alloy containing nickel as a main component, which is the same as that of the third internal electrode 33 of the first embodiment.

The other configurations of the third embodiment are substantially the same as those of the first embodiment.

In the manufacture of the multilayer ceramic capacitor according to the third embodiment, it is only necessary to change the unfired materials of the portions to be the first internal electrode 331 and the second internal electrode 332 from the unfired materials of the portions to be the first internal electrode 31 and the second internal electrode 32 in the first embodiment. For example, the portion to be the first internal electrode 331 after firing and the portion to be the second internal electrode 332 after firing are made of an alloy containing Ni as a main component, which is the same as that of the portion to be the first internal electrode 231 after firing and the portion to be the second internal electrode 232 after firing.

In the multilayer ceramic capacitor according to the third embodiment, as in the first embodiment, a strong internal stress acts particularly around the third internal electrode group 343, and electrostriction cracking caused by thermal expansion of the capacitance formation portion 18 can be suppressed.

Additionally, as in the second embodiment, when the multilayer ceramic capacitor is mounted on the substrate, the thermal expansion of the first internal electrode 331 and the second internal electrode 332 located near the covers 19 is particularly reduced. As a result, thermal cracking can be suppressed. Furthermore, when the Young's modulus of the first internal electrode 331 and the Young's modulus of the second internal electrode 332 are less than the Young's modulus of nickel, substrate bending cracking is also easily suppressed.

Here, in the embodiments, the thicknesses of the first internal electrodes 31, 231, or 331, the second internal electrodes 32, 232, or 332, and the third internal electrodes 33, 233, or 333 are substantially equal to each other, but may be different from each other. Additionally, the number of the first internal electrodes 31, 231, or 331, the second internal electrodes 32, 232, or 332, and the third internal electrodes 33, 233, or 333 is not limited, and can be appropriately selected according to the thermal expansion coefficient of each of the first internal electrodes 31, 231, or 331, the second internal electrodes 32, 232, or 332, and the third internal electrodes 33, 233, or 333, the soldering temperature, and the like. For example, the proportion of the number of the first internal electrodes 31, 231, or 331 to the total number of the first internal electrodes 31, 231, or 331, the second internal electrodes 32, 232, or 332 and the third internal electrodes 33, 233, or 333 is 10% or greater and 30% or less, the proportion of the number of the second internal electrodes 32, 232, or 332 to the total number is 10% or greater and 30% or less, and the proportion of the number of the third internal electrodes 33, 233, or 333 to the total number is 40% or greater and 80% or less.

Additionally, the main component of the internal electrode 12 and the internal electrode 13 is not limited to nickel, and copper (Cu), palladium (Pd), platinum (Pt), silver (Ag), gold (Au), or the like may be the main component of the internal electrode 12 and the internal electrode 13.

Other Embodiments

Although the embodiments have been described in detail, the present disclosure is not limited to the specific embodiments, and various modifications and changes can be made within the scope described in the claims.

For example, in the above-described embodiments, the multilayer ceramic capacitor has been described as an example of the multilayer ceramic electronic component, but the present disclosure is applicable to multilayer ceramic electronic components in general. Examples of such a multilayer ceramic electronic component include a chip varistor, a chip thermistor, and a multilayer inductor.

Aspects of the present disclosure are as follows, for example.

<1> A multilayer ceramic electronic component includes:

a laminate including an internal electrode group including a plurality of internal electrodes laminated along a first axis, and a plurality of ceramic layers, each of which is located between adjacent internal electrodes among the plurality of internal electrodes; and a pair of external electrodes connected to the plurality of internal electrodes. The internal electrode group includes:

a first internal electrode group including one or more first internal electrodes located at an end in a first direction of the first axis among the plurality of internal electrodes;

a second internal electrode group including one or more second internal electrodes located at an end in a second direction opposite to the first direction of the first axis among the plurality of internal electrodes; and a third internal electrode group including one or more third internal electrodes located between the first internal electrode group and the second internal electrode group among the plurality of internal electrodes. A first thermal expansion coefficient of the one or more first internal electrodes and a second thermal expansion coefficient of the one or more second internal electrodes are less than a third thermal expansion coefficient of the one or more third internal electrodes.

<2> The multilayer ceramic electronic component as described in <1>, wherein the third thermal expansion coefficient is 1.1 times or greater and 1.5 times or less the first thermal expansion coefficient and the second thermal expansion coefficient.

<3> The multilayer ceramic electronic component as described in <1> or <2>, wherein an element of a main component of the one or more first internal electrodes, an element of a main component of the one or more second internal electrodes, and an element of a main component of the one or more third internal electrodes are common, wherein a composition of a material of the one or more first internal electrodes is different from a composition of a material of the one or more third internal electrodes, and wherein a composition of a material of the one or more second internal electrodes is different from the composition of the material of the one or more third internal electrodes.

<4> The multilayer ceramic electronic component as described in <3>, wherein the element of the main component of the one or more first internal electrodes, the element of the main component of the one or more second internal electrodes, and the element of the main component of the one or more third internal electrodes are nickel.

<5> The multilayer ceramic electronic component as described in <4>, wherein the third thermal expansion coefficient is greater than a thermal expansion coefficient of the nickel.

<6> The multilayer ceramic electronic component as described in <4> or <5>, wherein the one or more third internal electrodes contain at least one additional element selected from the group consisting of indium, zinc, aluminum, tin, manganese, silver, copper, and gold.

<7> The multilayer ceramic electronic component as described in <4> or <5>, wherein the one or more third internal electrodes contain at least one additional element selected from the group consisting of zinc, aluminum, and manganese.

<8> The multilayer ceramic electronic component as described in <6> or <7>, wherein a proportion of the at least one additional element in the one or more third internal electrodes is 0.2 at % or greater and 3.0 at % or less.

<9> The multilayer ceramic electronic component as described in <4>, wherein the first thermal expansion coefficient and the second thermal expansion coefficient are less than a thermal expansion coefficient of the nickel.

<10> The multilayer ceramic electronic component as described in <9>, wherein the one or more first internal electrodes and the one or more second internal electrodes contain at least one additional element selected from the group consisting of palladium, yttrium, platinum, titanium, vanadium, niobium, tantalum, germanium, hafnium, zirconium, silicon, and gallium.

<11> The multilayer ceramic electronic component as described in <9>, wherein the one or more first internal electrodes and the one or more second internal electrodes contain at least one additional element selected from the group consisting of yttrium, platinum, niobium, tantalum, germanium, hafnium, zirconium, silicon, and gallium.

<12> The multilayer ceramic electronic component as described in <10> or <11>, wherein a proportion of the at least one additional element in each of the one or more first internal electrodes and the one or more second internal electrodes is 0.2 at % or greater and 3.0 at % or less.

<13> The multilayer ceramic electronic component as described in <4>, wherein the first thermal expansion coefficient and the second thermal expansion coefficient are less than a thermal expansion coefficient of the nickel, and the third thermal expansion coefficient is greater than the thermal expansion coefficient of the nickel.

<14> The multilayer ceramic electronic component as described in <13>, wherein the one or more first internal electrodes and the one or more second internal electrodes contain at least one additional element selected from the group consisting of palladium, yttrium, platinum, titanium, vanadium, niobium, tantalum, germanium, hafnium, zirconium, silicon, and gallium, and the one or more third internal electrodes contain at least one additional element selected from the group consisting of indium, zinc, aluminum, tin, manganese, silver, copper, and gold.

<15> The multilayer ceramic electronic component as described in <13>, wherein the one or more first internal electrodes and the one or more second internal electrodes include at least one additional element selected from the group consisting of yttrium, platinum, niobium, tantalum, germanium, hafnium, zirconium, silicon, and gallium, and the one or more third internal electrodes include at least one additional element selected from the group consisting of zinc, aluminum, and manganese.

<16> The multilayer ceramic electronic component as described in <14> or <15>, wherein a proportion of the at least one additional element in each of the one or more first internal electrodes, the one or more second internal electrodes, and the one or more third internal electrodes is 0.2 at % or greater and 3.0 at % or less.

<17> The multilayer ceramic electronic component as described in any one of <9> to <12>, wherein a Young's modulus of the one or more first internal electrodes and a Young's modulus of the one or more second internal electrodes are less than a Young's modulus of the nickel.

<18> The multilayer ceramic electronic component as described in any one of <13> to <16>, wherein a Young's modulus of the one or more first internal electrodes and a Young's modulus of the one or more second internal electrodes are less than a Young's modulus of the nickel.

<19> The multilayer ceramic electronic component as described in any one of <1> to <18>, wherein a proportion of a number of the one or more first internal electrodes with respect to a total number of the one or more first internal electrodes, the one or more second internal electrodes, and the one or more third internal electrodes is 10% or greater and 30% or less, a proportion of a number of the one or more second internal electrodes with respect to the total number is 10% or greater and 30% or less, and a proportion of a number of the one or more third internal electrodes with respect to the total number is 40% or greater and 80% or less.

What is claimed is:

1. A multilayer ceramic electronic component comprising:

a laminate including an internal electrode group including a plurality of internal electrodes laminated along a first axis, and a plurality of ceramic layers, each of which is located between adjacent internal electrodes among the plurality of internal electrodes; and a pair of external electrodes connected to the plurality of internal electrodes, wherein the internal electrode group includes:

a first internal electrode group including one or more first internal electrodes located at an end in a first direction of the first axis among the plurality of internal electrodes;

a second internal electrode group including one or more second internal electrodes located at an end in a second direction opposite to the first direction of the first axis among the plurality of internal electrodes; and a third internal electrode group including one or more third internal electrodes located between the first internal electrode group and the second internal electrode group among the plurality of internal electrodes, and wherein a first thermal expansion coefficient of the one or more first internal electrodes and a second thermal expansion coefficient of the one or more second internal electrodes are less than a third thermal expansion coefficient of the one or more third internal electrodes.

2. The multilayer ceramic electronic component as claimed in claim 1, wherein the third thermal expansion coefficient is 1.1 times or greater and 1.5 times or less the first thermal expansion coefficient and the second thermal expansion coefficient.

3. The multilayer ceramic electronic component as claimed in claim 1, wherein an element of a main component of the one or more first internal electrodes, an element of a main component of the one or more second internal electrodes, and an element of a main component of the one or more third internal electrodes are common, wherein a composition of a material of the one or more first internal electrodes is different from a composition of a material of the one or more third internal electrodes, and wherein a composition of a material of the one or more second internal electrodes is different from the composition of the material of the one or more third internal electrodes.

4. The multilayer ceramic electronic component as claimed in claim 3, wherein the element of the main component of the one or more first internal electrodes, the element of the main component of the one or more second internal electrodes, and the element of the main component of the one or more third internal electrodes are nickel.

5. The multilayer ceramic electronic component as claimed in claim 4, wherein the third thermal expansion coefficient is greater than a thermal expansion coefficient of the nickel.

6. The multilayer ceramic electronic component as claimed in claim 5, wherein the one or more third internal electrodes contain at least one additional element selected from the group consisting of indium, zinc, aluminum, tin, manganese, silver, copper, and gold.

7. The multilayer ceramic electronic component as claimed in claim 5, wherein the one or more third internal electrodes contain at least one additional element selected from the group consisting of zinc, aluminum, and manganese.

8. The multilayer ceramic electronic component as claimed in claim 6, wherein a proportion of the at least one additional element in the one or more third internal electrodes is 0.2 at % or greater and 3.0 at % or less.

9. The multilayer ceramic electronic component as claimed in claim 4, wherein the first thermal expansion coefficient and the second thermal expansion coefficient are less than a thermal expansion coefficient of the nickel.

10. The multilayer ceramic electronic component as claimed in claim 9, wherein the one or more first internal electrodes and the one or more second internal electrodes contain at least one additional element selected from the group consisting of palladium, yttrium, platinum, titanium, vanadium, niobium, tantalum, germanium, hafnium, zirconium, silicon, and gallium.

11. The multilayer ceramic electronic component as claimed in claim 9, wherein the one or more first internal electrodes and the one or more second internal electrodes contain at least one additional element selected from the group consisting of yttrium, platinum, niobium, tantalum, germanium, hafnium, zirconium, silicon, and gallium.

12. The multilayer ceramic electronic component as claimed in claim 10, wherein a proportion of the at least one additional element in each of the one or more first internal electrodes and the one or more second internal electrodes is 0.2 at % or greater and 3.0 at % or less.

13. The multilayer ceramic electronic component as claimed in claim 4, wherein the first thermal expansion coefficient and the second thermal expansion coefficient are less than a thermal expansion coefficient of the nickel, and the third thermal expansion coefficient is greater than the thermal expansion coefficient of the nickel.

14. The multilayer ceramic electronic component as claimed in claim 13, wherein the one or more first internal electrodes and the one or more second internal electrodes contain at least one additional element selected from the group consisting of palladium, yttrium, platinum, titanium, vanadium, niobium, tantalum, germanium, hafnium, zirconium, silicon, and gallium, and the one or more third internal electrodes contain at least one additional element selected from the group consisting of indium, zinc, aluminum, tin, manganese, silver, copper, and gold.

15. The multilayer ceramic electronic component as claimed in claim 13, wherein the one or more first internal electrodes and the one or more second internal electrodes include at least one additional element selected from the group consisting of yttrium, platinum, niobium, tantalum, germanium, hafnium, zirconium, silicon, and gallium, and the one or more third internal electrodes include at least one additional element selected from the group consisting of zinc, aluminum, and manganese.

16. The multilayer ceramic electronic component as claimed in claim 15, wherein a proportion of the at least one additional element in each of the one or more first internal electrodes, the one or more second internal electrodes, and the one or more third internal electrodes is 0.2 at % or greater and 3.0 at % or less.

17. The multilayer ceramic electronic component as claimed in claim 9, wherein a Young's modulus of the one or more first internal electrodes and a Young's modulus of the one or more second internal electrodes are less than a Young's modulus of the nickel.

18. The multilayer ceramic electronic component as claimed in claim 13, wherein a Young's modulus of the one or more first internal electrodes and a Young's modulus of the one or more second internal electrodes are less than a Young's modulus of the nickel.

19. The multilayer ceramic electronic component as claimed in claim 1, wherein a proportion of a number of the one or more first internal electrodes with respect to a total number of the one or more first internal electrodes, the one or more second internal electrodes, and the one or more third internal electrodes is 10% or greater and 30% or less, a proportion of a number of the one or more second internal electrodes with respect to the total number is 10% or greater and 30% or less, and a proportion of a number of the one or more third internal electrodes with respect to the total number is 40% or greater and 80% or less.

* * * * *